United States Patent
Tieke et al.

(10) Patent No.: US 7,719,937 B2
(45) Date of Patent: May 18, 2010

(54) METHOD OF OPTIMIZING THE WRITE POWER FOR RECORDING MARKS IN AN INFORMATION LAYER OF A RECORD CARRIER AND RECORDING DEVICE USING SUCH AN OPTIMIZING METHOD

(75) Inventors: Benno Tieke, Eindhoven (NL); Fulong Tang, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 600 days.

(21) Appl. No.: 11/572,005

(22) PCT Filed: Jul. 7, 2005

(86) PCT No.: PCT/IB2005/052262

§ 371 (c)(1),
(2), (4) Date: Jan. 12, 2007

(87) PCT Pub. No.: WO2006/008690

PCT Pub. Date: Jan. 26, 2006

(65) Prior Publication Data

US 2008/0094958 A1    Apr. 24, 2008

(30) Foreign Application Priority Data

Jul. 16, 2004    (EP)    .................................. 04103408

(51) Int. Cl.
*G11B 7/00*    (2006.01)
(52) U.S. Cl. .................................. 369/47.53; 369/53.34
(58) Field of Classification Search ........................ None
See application file for complete search history.

(56) References Cited

U.S. PATENT DOCUMENTS

| | | | |
|---|---|---|---|
| 6,285,639 | B1 | 9/2001 | Maenza et al. |
| 6,611,481 | B1 | 8/2003 | Koishi et al. |
| 7,269,113 | B2 * | 9/2007 | Spruit ..................... 369/53.33 |
| 2002/0136123 | A1 | 9/2002 | Ogawa |
| 2003/0035355 | A1 | 2/2003 | Morishima |
| 2003/0044719 | A1 * | 3/2003 | Katoh et al. ........... 430/270.13 |
| 2003/0214888 | A1 * | 11/2003 | Kato et al. ............... 369/47.53 |

FOREIGN PATENT DOCUMENTS

EP    118265 A1    12/1984

(Continued)

OTHER PUBLICATIONS

ISR: PCT/IB2005/052262.

(Continued)

*Primary Examiner*—Joseph H Feild
*Assistant Examiner*—Joseph Haley

(57) ABSTRACT

A method of optimizing the write power for recording marks in an information layer of a record carrier by irradiating the information layer with a (pulsed) radiation beam. The method includes recording a pattern of test marks including short marks having a predetermined short nominal runlength onto the record carrier by applying at least three different write powers; measuring the runlengths of the recorded short marks obtained by applying the at least three different write powers; and determining an optimum write power based of the deviations of the measured runlengths from the nominal runlength of said short marks.

15 Claims, 4 Drawing Sheets

FOREIGN PATENT DOCUMENTS

Figure 1:
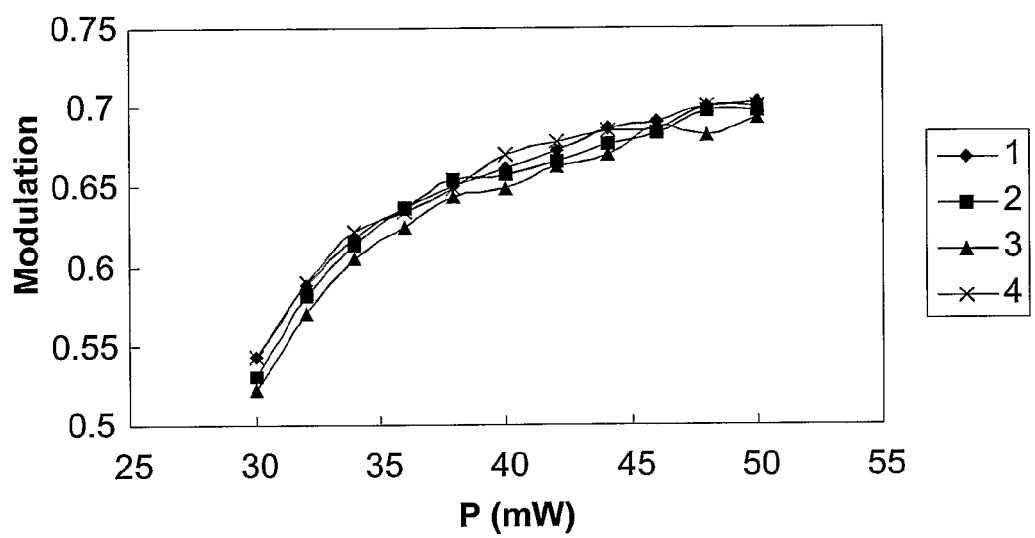

| | | |
|---|---|---|
| EP | 1244098 A2 | 9/2002 |
| EP | 1249834 A2 | 10/2002 |
| EP | 1335356 A1 | 8/2003 |
| EP | 1349154 A1 | 10/2003 |
| EP | 1361569 A2 | 11/2003 |
| EP | 1361570 A1 | 11/2003 |
| EP | 1361571 A1 | 11/2003 |
| EP | 1548711 A1 | 6/2005 |
| JP | 2002347341 A | 12/2002 |
| JP | 2003187446 A | 7/2003 |
| JP | 2003208716 A | 7/2003 |
| JP | 2003228832 A | 8/2003 |
| WO | WO 03065357 A2 * | 8/2003 |
| WO | 2004029944 A1 | 8/2004 |

OTHER PUBLICATIONS

Written Opinion: PCT/IB2005/052262.

* cited by examiner

METHOD OF OPTIMIZING THE WRITE POWER FOR RECORDING MARKS IN AN INFORMATION LAYER OF A RECORD CARRIER AND RECORDING DEVICE USING SUCH AN OPTIMIZING METHOD

The invention relates to a method of optimizing the write power of a radiation beam for recording marks in an information layer of a record carrier by irradiating the information layer by the radiation beam, said information layer having a phase that is reversibly changeable between a first phase and a second phase. The invention especially relates to such a method of recording marks in a record carrier having a phase that is reversibly changeable between a crystal phase and an amorphous phase. The present invention further relates to a recording device and a recording method using such an optimizing method.

When a so-called 1 T write strategy is used for recording marks in the information layer of a record carrier, said information layer containing, for example, phase-change recording materials, an OPC (Optimum Power Control) procedure is usually run to determine the optimum write powers by measuring the modulation change of written test marks with the write power applied during writing of these test marks. The OPC procedure is generally performed in the specially reserved PCA (Power Calibration Area) of a disc. An optimum write power is derived from a resulting curve of measured modulation versus applied write power. If required, disk-related information stored on the disc itself, for example in the ATIP, may be used in deriving the optimum write power.

Increasing the recording speed when recording on phase-change type discs such as, for example, CD-RW and DVD+RW requires faster materials and new write strategies. An important recent development is the introduction of the so-called 2 T write strategies (WS) which have been incorporated in the Ultra-Speed CD-RW standard and the High-Speed DVD+RW standard. OPC procedures for conventional 1T write strategies for phase-change recording derive the optimum write power from the measured modulation vs. applied write power curve. Applying a similar approach to the 2 T write strategies when recording on the faster phase-change materials is not possible (or at least does not provide a robust and satisfactory solution). The main reason for this is that there is no direct relation between the measured modulation and the recording performance (expressed by the jitter of the written marks), as is observed for 1 T write strategies. Thus, the procedures for optimizing write strategy parameters for 2 T write strategies, such as the write powers, have to be redesigned as well.

It is an object of the present invention to provide a method of optimizing the write power for recording marks in an information layer of a record carrier, in particular when applying an nT write strategy, n being an integer greater than 1, preferably for a 2 T write strategy. It is a further object to provide a recording method and a recording device for recording marks in an information layer of a record carrier.

The object is achieved according to the present invention by a method of optimizing the write power for recording marks in an information layer of a record, said information layer having a phase that is reversibly changeable between a first phase and a second phase, wherein said method comprises the steps of:

recording a pattern of test marks at least comprising short marks having a predetermined short nominal runlength onto the record carrier by applying at least three different write powers, measuring the runlengths of said short marks recorded through the application the at least three different write powers, determining an optimum write power based on the deviations of the measured runlengths from the nominal runlength of said short marks.

According to an embodiment, the optimum write power is found when the deviation between a measured runlength and the nominal runlength of said short marks is zero, or at least substantially zero.

The object is further achieved by providing a recording method for recording marks representing user data in an information layer of a record carrier by irradiating the information layer with a radiation beam, said information layer having a phase that is reversibly changeable between a first phase and a second phase, said recording method comprising the steps of:

optimizing the write power for recording said marks by a method of optimizing the write power to obtain an optimum write power, and recording said marks by applying said optimum write power.

The invention is based on the idea to look for an underlying important parameter indicative of the recording performance in order to optimize the write strategy. It has been found that this parameter is the resulting mark length of the short marks recorded on the record carrier, preferably of the shortest allowed mark length. Since the ratio of the short (or the shortest) marks to the longer marks of the total channel code (e.g. NRZI code) in optical recording is quite high (e.g. for CD-RW the ratio of 3 T marks is higher than 30%), and since the shortest marks are the most difficult marks to be optimized, the other marks are recorded satisfactorily and with sufficiently low jitter if the shortest marks are recorded satisfactorily and with sufficiently low jitter.

According to a preferred embodiment, shortest marks having the shortest runlength allowed by the applied modulation method (such as, for example, EFM used for CD and EFM+ used for DVD) are recorded as test marks, and the runlengths of said shortest test marks are measured and used for determining the optimum write power. For example, for CD-RW the shortest runlength allowed by the EFM modulation method is 3 T, so that the runlength of these 3 T marks is measured after recording and used for determining the optimum write power. The difference between the measured runlength and the nominal runlength of said 3 T marks is used in particular for this determination.

In a further preferred embodiment, the test marks are recorded with three different write power values around a default optimum write power value. Said default optimum write power value is obtained on the basis of, for example, previous experiments on a number of record carriers, or is alternatively set to the optimum write power determined in a previous recording action or OPC procedure.

The method of optimizing the write power may be used before each new recording action to find the optimum write power. Alternatively, however, the method is applied continuously or at regular intervals during each recording action (often referred to as "walking OPC"). In this embodiment the method of optimizing the write power further comprises the steps of:

recording marks including short marks onto the record carrier by applying a previously determined optimum write power, measuring the runlengths of said short marks recorded by applying the previously determined optimum write power, adjusting the optimum write power on the basis of the deviation between the measured runlength and the nominal runlength of said short marks, such that the deviation between the measured runlength and the nominal runlength of said short marks is substantially zero and/or the jitter is minimal.

Thus patterns of marks representing user data are recorded in this embodiment, and the runlengths of the short marks included therein, preferably the most recently recorded short marks, are measured and used for adjusting the optimum write power.

To check whether the modulation of the recorded marks after writing meets the relevant specification, the following additional steps are proposed in a further embodiment:

measuring the modulations of said short marks recorded with the use of the at least three different write powers, checking whether the modulation of said short marks recorded with the use of the optimum write power results in a modulation above a predetermined threshold modulation.

It is noted that the jitter of the recorded marks may not always be at its very minimum when the deviation between a measured runlength and the nominal runlength of the short marks is zero. In an alternative method of optimizing the write power according to the invention, the jitter itself (in particular the land jitter) is minimized. Now the method of optimizing the write power comprises the step of determining an optimum write power on the basis of the deviations of the measured runlengths from the nominal runlength of the short marks, such that the jitter is minimal.

Figure 2:
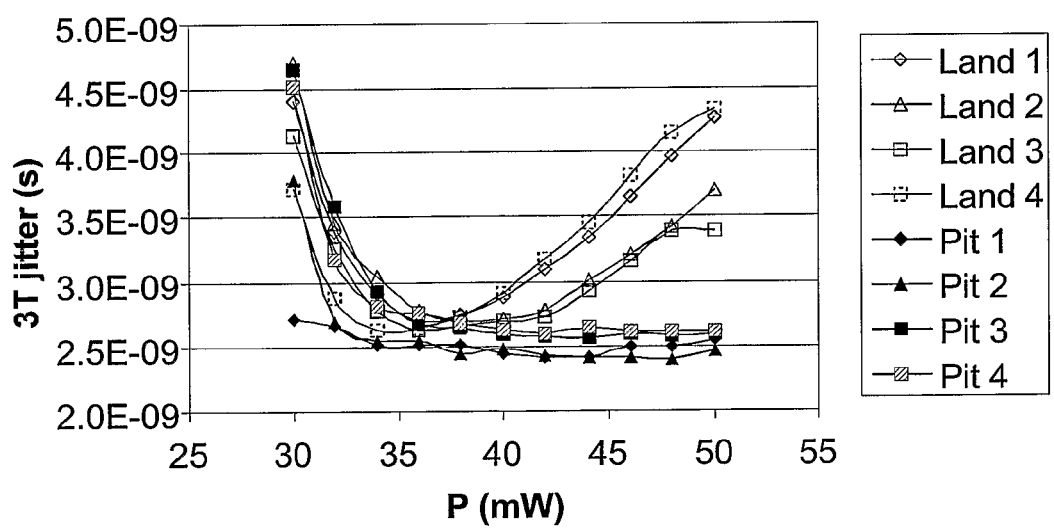
Figure 3:
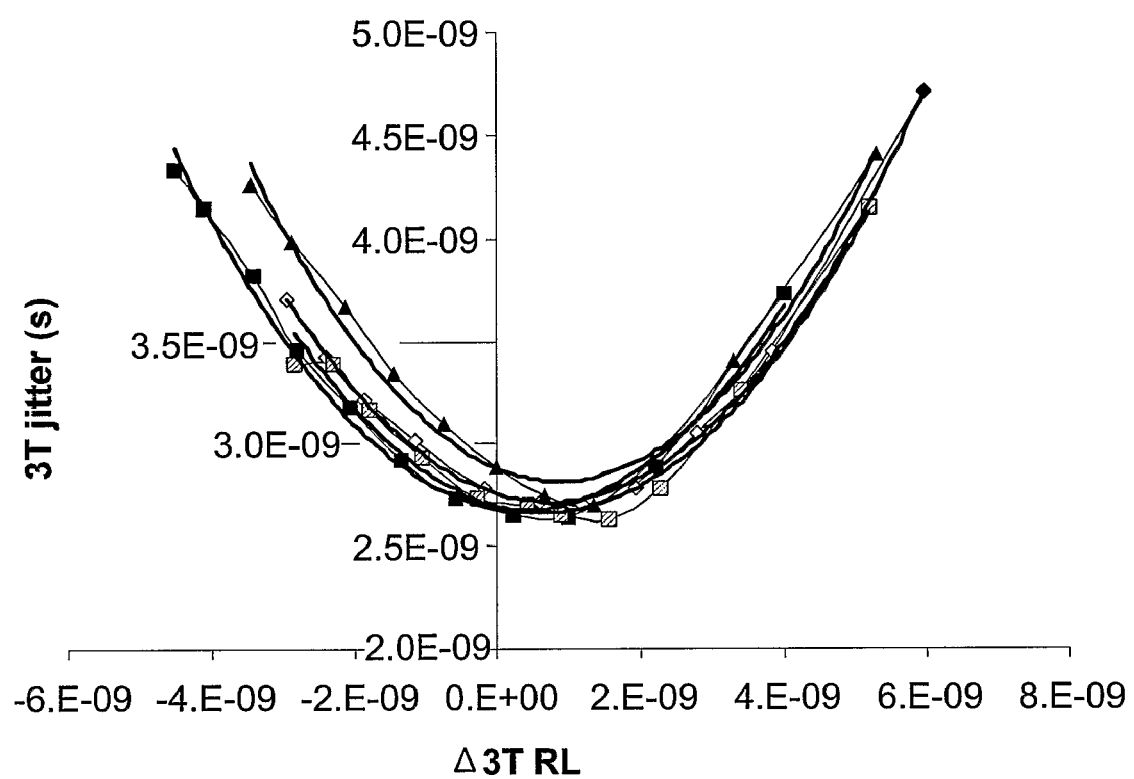
Figure 4:
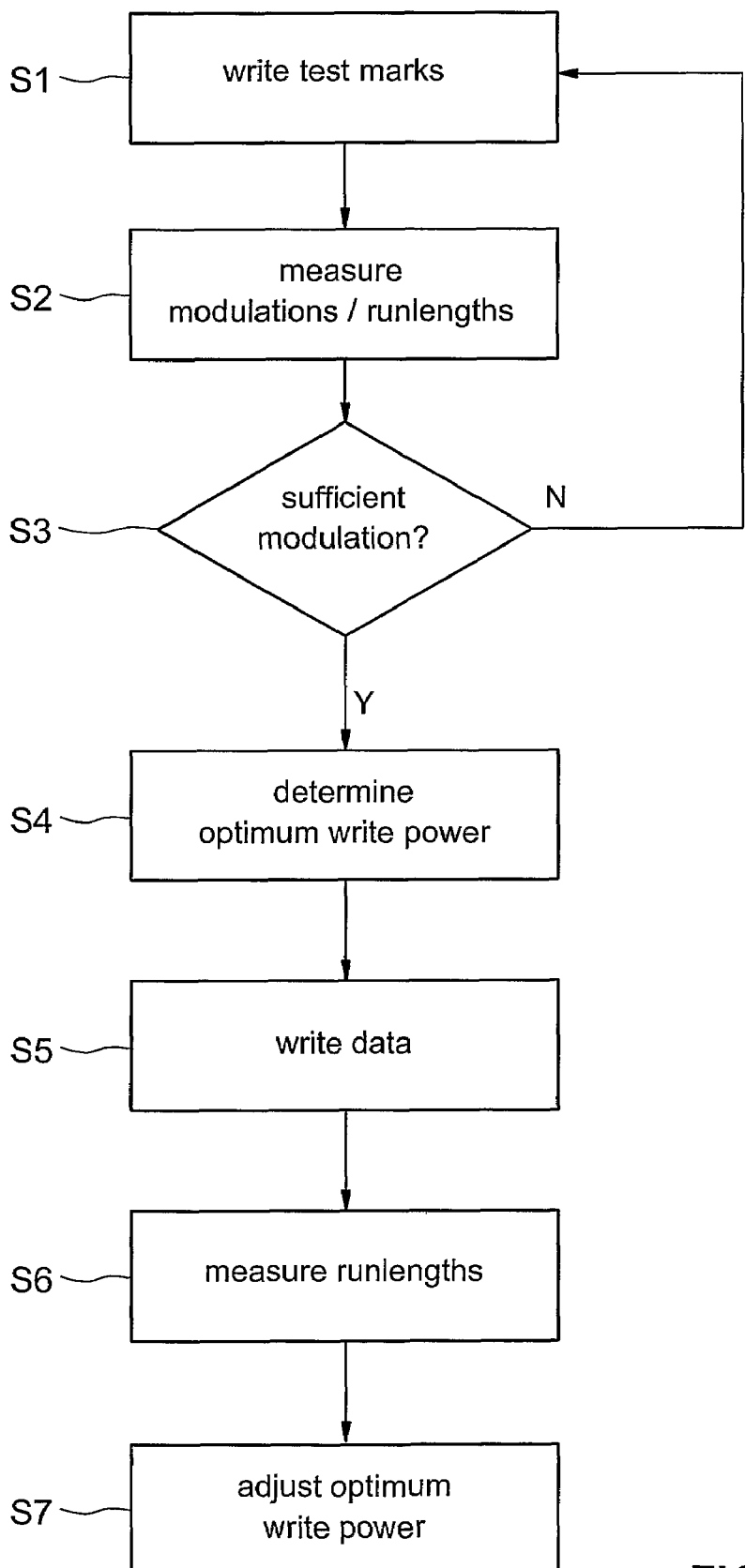
Figure 5:
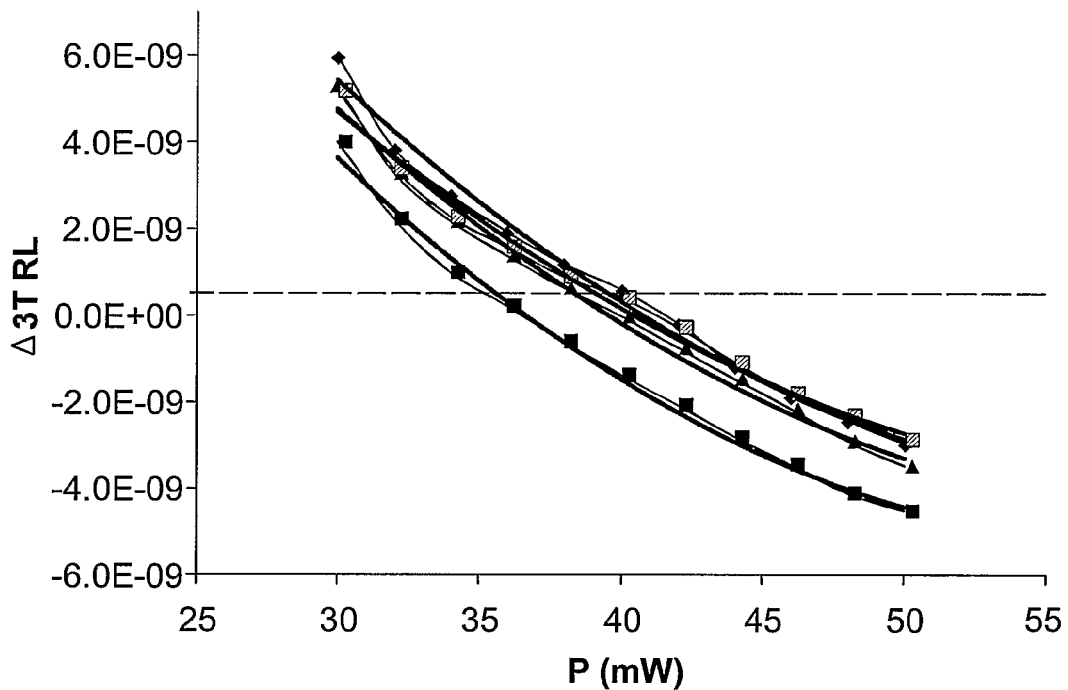
Figure 6:
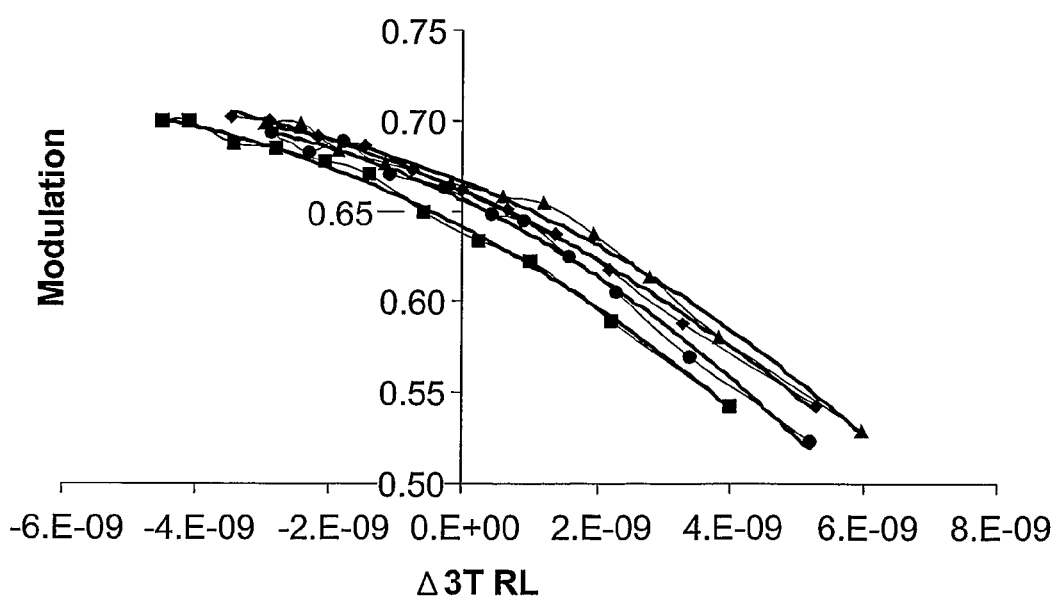

The invention will now be explained in more detail with reference to the accompanying drawings, in which FIG. 1 shows curves of the write power plotted against the modulation for different parameters settings of a 2 T write strategy, FIG. 2 shows curves of the write power plotted against the jitter of 3 T marks for different 2 T write strategies, FIG. 3 shows curves of the difference ($\Delta 3TRL$) between a measured 3 T runlength and a nominal 3 T runlength plotted against the 3 T land jitter for different write strategies, FIG. 4 is a flowchart illustrating a method according to the invention, FIG. 5 shows curves of the difference ($\Delta 3TRL$) between measured 3 T runlengths and nominal 3 T runlengths plotted against the write power for different write strategies, and FIG. 6 shows curves of the modulation plotted against the difference ($\Delta 3TRL$) between measured 3 T runlengths and nominal 3 T runlengths for different write strategies.

FIG. 1 shows the curves of the modulation versus the write power for four parameter settings (numbered 1 to 4) of a 2 T write strategy (WS). Apparently, the modulation is only a function of the write power. It appears not to depend on the details of other WS parameters since the four different parameters settings give exactly the same modulation.

However, for a certain write power the resulting jitter of the 3 T marks (especially the land jitter) varies considerably as a function of the applied write strategy (see FIG. 2). For example, at 42 mW, write strategies 2 and 3 give a land jitter of 28 ns, whereas write strategies 1 and 4 result in a land jitter of 33 ns. Moreover, the optimum write power for each write strategy may be considerably different, e.g. 36 mW for WS 4 and 40 mW for WS 2. It is noted that the attainable bottom jitter (i.e. the lowest jitter value of a curve) is very similar for all write strategies. However, this bottom jitter is, for different write strategies, achieved for different write power values and thus at different modulation values.

Another problem, which is apparent from FIG. 2 is that the curve of the jitter vs. the write power is asymmetrical, with a steep increase on the low-power side and a shallow increase on the high-power side. Generally, such an asymmetrical curve is not ideal for optimizing the write strategy parameters; a symmetrically shaped parabolic curve would be preferred.

A third problem for 2 T write strategies is that the number of WS parameters may be large, and the parameter settings are critical at a given write power. Some of the parameters, especially those related to the shorter marks such as 3 T marks, have to be defined with a high timing resolution (for example a timing resolution of up to $\frac{1}{16}$ T). The resulting jitter, especially the land jitter, may be very sensitive to these parameters, as is apparent from FIG. 2. The solution to the problem of write strategy parameter, and especially write power, optimization described above is to look for an underlying important parameter indicative of the recording performance. This parameter is the length of the recorded 3 T mark or, more generally, the length of the shortest mark allowed by the applied modulation method, or at least of the short marks. It appears that the jitter (which is the most important parameter indicative of the recording performance; a low jitter is preferred) is high when the length of the recorded 3 T marks is not correct.

If the curve of the 3 T land jitter is plotted against the difference between the measured 3 T runlength and the nominal 3 T runlength ($\Delta 3TRL$), all curves for different parameters settings of a 2 T write strategy become a parabola (see FIG. 3). A similar bottom jitter (i.e. the lowest jitter value of the parabolic curve) can be found for all different write strategy parameter settings if the write power changes. Furthermore, all parabolas for the different write strategies are scaled to the same "generic" parabola (see FIG. 3).

FIG. 3 illustrates that the optimization of write power, or more generally of the WS parameters, becomes straightforward when using the relation between the 3 T land jitter and the 3 T mark length. It is noted that the pit jitter remains almost constant when the writing power changes. Therefore, it is not required to consider the pit jitter in this optimization process (although this pit jitter may be considered also).

By measuring three points one can already derive the three parameters of a parabolic curve. Measuring of more points will improve the accuracy of the parabolic curve. The resulting parabola curve readily enables the optimum write power (to be used for recording marks having a low jitter) for a set of 2 T write strategy parameters to be derived.

As described, the land jitter vs. $\Delta 3TRL$ curves scale to the same basic curve. All different write strategies result in a similar bottom jitter value for a similar $\Delta 3TRL$, and therefore for a similar recorded 3 T mark length. Generally, the bottom jitter is found to be equal to zero for a $\Delta 3TRL$. For the different 2 T WS parameter settings in FIG. 3, however, the $\Delta 3TRL$ corresponding to the lowest jitter (i.e. the bottom jitter) is around 0.5 ns. Therefore, it is possible to optimize for a certain target $\Delta 3TRL$ value close to, but not exactly equal to, zero (in this case 0.5 ns).

Based on the observations above, an example of a possible OPC method according to the invention for determining the optimum write power for a given 2 T write strategy by measuring of $\Delta 3TRL$ will be discussed below, with reference to a flowchart shown in FIG. 4. In a first step S1, a drive writes random test marks on three tracks of the record carrier (for example in a specially reserved Power Calibration Area) using three different write power values around a default write power value, while using a default parameter setting for the remaining parameters of the write strategy. The default write power value may be obtained from a previous optimization process or from a number of experiments using the same type of record carrier. Said random test marks include at least a number of the shortest allowed marks (for example 3 T marks for recordable or rewritable CD and DVD type record carriers).

Subsequently (step S2), the runlength of said written shortest marks is measured for each of the three different write powers. Optionally, the resulting modulations of said written shortest marks are measured at the same time.

From the difference Δ3TRL between the measured runlengths and the nominal runlength of said shortest marks (3 T marks), (part of) a parabolic curve of the write power versus Δ3TRL is determined, as is shown in FIG. 5. Optionally, if the modulations were measured in step S2, a further curve of Δ3TRL versus modulation is determined, as shown in FIG. 6. The latter curve can be used in an optional step S3 to determine those Δ3TRL values, and thus implicitly those write powers, which result in a sufficiently high modulation of the recorded marks (as specified in the relevant standard). Alternatively, or in addition, a curve of the write power versus the modulation of the recorded marks as shown in FIG. 1 can be obtained and used to determine those write powers which result in a sufficiently high modulation.

In the next step S4, the optimum write power is determined. A method of determining the optimum write power is based on the derived parabolic curve of the write power versus Δ3TRL as shown in FIG. 5. The write power is derived from this parabolic curve, which is expected to result in the optimum Δ3TRL. The optimum Δ3TRL itself is either set to 0 ns, or to a value previously determined as the Δ3TRL for which the jitter is expected to be minimal, for example based on the parabolic curve of Δ3TRL versus (land) jitter as shown in FIG. 3, which illustrates that the jitter is lowest for Δ3TRL≈0.5 ns. The write power thus determined is then used as the optimum write power for the optimum parameter setting of the given 2 T write strategy.

This optimum write power is now used in step S5 to write data. When subsequently a "walking OPC" procedure is applied, the runlengths of at least the shortest marks in the written data are measured again in step S6. The Δ3TRL can then again be determined for the measured runlengths, and the new Δ3TRL can then again be compared with the optimum Δ3TRL so as to adjust, if necessary, the optimum write power in step S7. Fluctuations of stack thickness and material composition in the record carrier or drive or temperature variations may cause changes in the optimum write power for different areas of a disc. It is thus possible to adjust the write power for such fluctuations and variations during the process of writing data in that such a "walking OPC" procedure is carried out. After normal data (i.e. data not specifically intended for the OPC procedures) have been written on a disc, the drive measures the Δ3TRL, compares it with the optimum value, and adjusts the write power.

It should be noted that either a single writing step for writing test patterns or two separate writing steps for writing test marks may be used for the above-mentioned combined measurement of the mark lengths and the (optional) measurement of the modulation of the recorded marks in step S2. Furthermore, the invention is not limited to 2T write strategies, but may be generally applied to any nT write strategy, n being an integer greater than 1. The invention is not limited to any particular type of record carrier, but may be applied to any recordable or rewritable type of record carrier, such as any CD, DVD, or BD type of record carrier. For some types of record carriers, the shortest allowed marks may be not 3T marks, but, for example, 2T marks, as is the case for ED record carriers. It is further possible to use and measure not only the runlength of the shortest marks, but also the runlengths of longer marks which can then be taken into account for determining the optimum write power. For example, not only the 3T marks may be used, but also the somewhat longer 4T and 5T marks. The pattern of test marks must then be adapted accordingly.

The invention claimed is:

1. A method of optimizing write power for recording marks in an information layer of a record carrier by irradiating the information layer with a radiation beam, said information layer having a phase that is reversibly changeable between a first phase and a second phase, comprising the acts of:
    recording a pattern of test marks at least comprising short marks having a predetermined short nominal runlength onto the record carrier by applying at least three different write powers,
    measuring the runlengths of said short marks recorded through the application of the at least three different write powers,
    determining an optimum write power based on a curve of deviations of the measured runlengths from the nominal runlength of said short marks versus jitter of said short marks, and
    selecting the optimum write power associated with a deviation value that corresponds to a minimum jitter value from the curve.

2. The method as claimed in claim 1,
wherein, in said act of recording a pattern of test marks, shortest marks having the shortest runlength allowed by an applied modulation method are recorded, and wherein the runlengths of said shortest marks are measured and used for determining the optimum write power.

3. The method as claimed in claim 1,
wherein, in said act of recording a pattern of test marks, the test marks are recorded in that the at least three different write powers around a default optimum write power are applied.

4. The method as claimed in claim 1,
further comprising the acts of:
    recording marks including short marks onto the record carrier by applying the determined optimum write power,
    measuring the runlengths of said short marks thus recorded by means of the determined optimum write power,
    adjusting the optimum write power based on the difference between the measured runlengths and the nominal runlength of said short marks.

5. The method as claimed in claim 1,
further comprising the acts of:
    measuring modulations of said recorded short marks recorded by means of the at least three different write powers,
    checking whether the applied write powers result in a modulation of the recorded short marks that lies above a predetermined threshold modulation.

6. The method of claim 1, further comprising the act of recording marks representing user data by applying said optimum write power.

7. The method of claim 1, further comprising the act of optimizing the write power for recording said marks by regularly repeating the acts of recording, measuring and selecting to adjust the optimum write power regularly during said recording.

8. A device for optimizing the write power for recording marks in an information layer of a record carrier, the device comprising:

a recording means a recorder for recording a pattern of test marks at least comprising short marks having a predetermined short nominal runlength onto the record carrier by applying at least three different write powers, a detector for measuring the runlengths of said short marks recorded by the application of the at least three different write powers, and processor for determining an optimum write power based on a curve of deviations of the measured runlengths from the nominal runlength of said short marks versus jitter of said short marks, and for selecting the optimum write power associated with a deviation value that corresponds to a minimum jitter value from the curve.

9. A recording device for recording the marks in the information layer of the record carrier by irradiating the information layer with a radiation beam, comprising the device of claim 8.

10. The recording device as claimed in claim 9,
wherein the recorder records the test marks including the short marks onto the record carrier by applying the determined optimum write power, detector measures the runlengths of said short marks recorded by means of the determined optimum write power, and the processor adjusts the optimum write power based on the deviation of the measured runlengths from the nominal runlength of said short marks.

11. A method of optimizing write power for recording marks in an information layer of a record carrier by irradiating the information layer with a radiation beam, the method comprising the acts of:

recording a pattern of test marks comprising marks having a predetermined nominal runlength onto the record carrier by applying at least three different write powers;

measuring runlengths of said recorded marks;

determining a jitter curve of deviation values of the measured runlengths from the nominal runlength of said marks versus jitter values of said marks;

determining from the jitter curve a deviation value that corresponds to a minimum jitter value;

determining a power curve of write power values versus the deviation values; and selecting from the power curve the optimum write power associated with the deviation value corresponding to the minimum jitter value.

12. The method of claim 11, further comprising the acts of:
measuring modulation values of said marks recorded with the at least three different write powers;

determining a modulation curve of the deviation values versus the measured modulation values; and selecting from the modulation curve selected deviation values corresponding to measured modulation values that are above a predetermined threshold modulation value.

13. The method of claim 11, further comprising the acts of:
measuring modulation values of said marks recorded with the at least three different write powers; and re-recording the pattern of test marks if the measuring modulation values are below a predetermined threshold modulation value.

14. The method of claim 11, wherein the jitter values correspond to jitter values of lands of the information layer.

15. The method of claim 11, wherein the marks have a shortest runlength allowed by an applied modulation used for the recording act.

* * * * *